(No Model.)

N. EVANS & W. A. HENRY.
WAGON JACK.

No. 489,157.

Patented Jan. 3, 1893.

Witnesses

Inventors
Nelson Evans and
William A. Henry.

By their Attorneys,

THE NORRIS PETERS CO., PHOTO-LITHO., WASHINGTON, D. C.

UNITED STATES PATENT OFFICE.

NELSON EVANS AND WILLIAM A. HENRY, OF UKIAH, CALIFORNIA.

WAGON-JACK.

SPECIFICATION forming part of Letters Patent No. 489,157, dated January 3, 1893.

Application filed March 16, 1892. Serial No. 425,122. (No model.)

*To all whom it may concern:*

Be it known that we, NELSON EVANS and WILLIAM A. HENRY, citizens of the United States, residing at Ukiah, in the county of Mendocino and State of California, have invented a new and useful Wagon-Jack, of which the following is a specification.

This invention relates to lifting jacks; and it has for its object to provide a lifting jack which is particularly adapted for raising wagon bodies, so that all four wheels thereof can be raised at one and the same time for the purpose of oiling the wheels or washing the wagon, which operation is a great saving of time and labor and especially adapts the device for use in wagon and repair shops. The jack is so constructed as to be also adapted for use in raising the front or rear wheels alone according to the option of the operator and for many other uses which will readily suggest themselves to those skilled in the art.

With these and many other objects in view which will readily appear as the nature of the invention is better understood, the same consists in the novel construction, combination and arrangement of parts hereinafter more fully described, illustrated and claimed.

Figure 1:
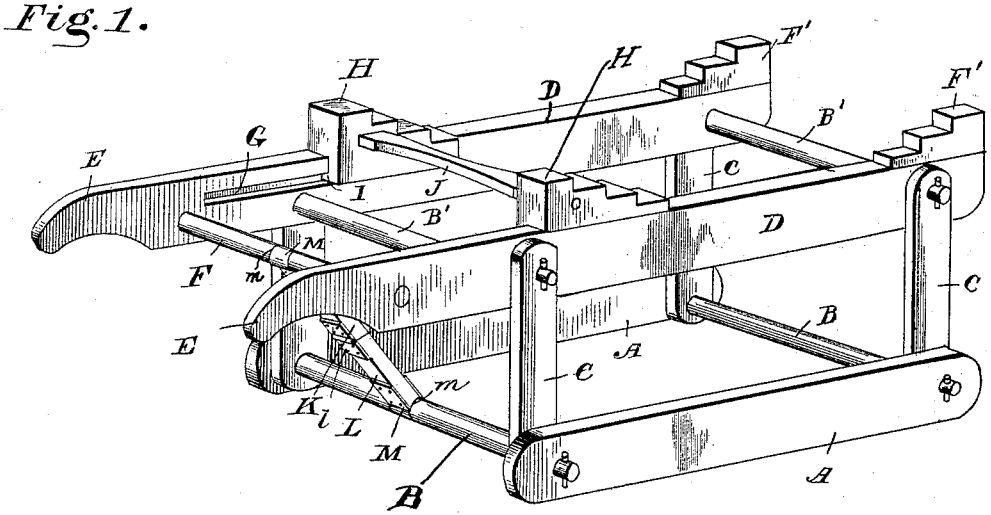
Figure 2:
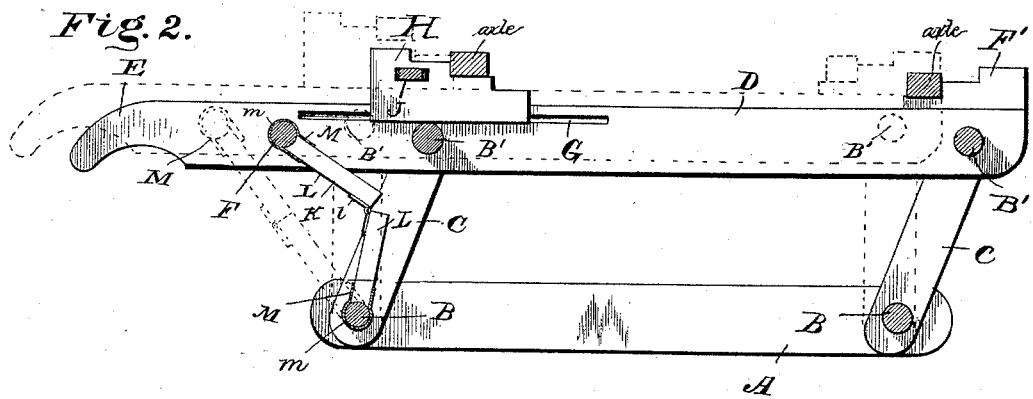
Figure 3:
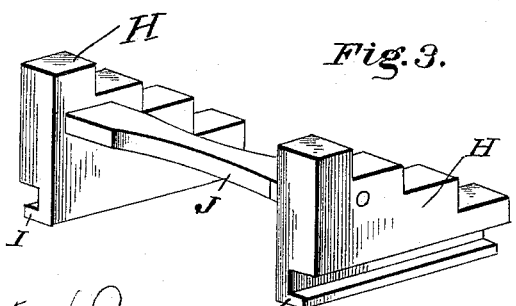

In the accompanying drawings;—Figure 1 is a perspective view of a lifting jack constructed in accordance with our invention. Fig. 2 is a vertical longitudinal sectional view of the same. Fig. 3 is a detail in perspective of the sliding rests.

Referring to the accompanying drawings;—

A, A represent opposite parallel bed or sill pieces, which are designed to rest upon the ground and support the various parts of the jack and the entire weight of the vehicle lifted. The said parallel sills are connected transversely at each end by the horizontal connecting rods or rounds B which may be keyed or bolted to said sills to rigidly hold the same together. Loosely mounted upon each end of each of said connecting rounds and inside of the opposite sills are the opposite end pairs of swinging lever arms C, the upper ends of which are also connected by the transverse connecting rods or rounds B'. The said upper connecting rounds B', which connect the upper ends of said swinging arms, carry and support the parallel supporting bars D, which carry the weight of the vehicle and are designed to be pulled under both axles of the vehicle simultaneously, when lifting, or pushed below the same to lower the vehicle to the ground. The said parallel supporting bars D are somewhat longer than the lower parallel sills A, and at one end extend beyond the rear set of swinging arms C and terminate in operating handles E, which handles are securely braced together by the rear connecting rod F. To one end of said parallel supporting bars D away from the handles E thereof, are secured the opposite stepped axle rests F', which are stationary upon said bars and are designed to be thrown under the front axle of a vehicle to elevate the same when desired, said front axle, which is somewhat lower than the rear axle, being shown as resting in one of the steps of said rest as seen in Fig. 2. The said supporting bars D are further provided adjacent to the handle ends thereof, with the opposite grooves G upon the inner faces thereof, and which accommodate the sliding stepped rests H, provided with the flanged tongues I engaging said grooves and connected by the connecting bar J, so that the same may be slid upon the supporting bars in order that they may be adjusted to the rear axle of the vehicle, according to the length of body of said vehicle or the distance between the front and rear axles of the same, said rear axle being shown in Fig. 2, as resting in one of the steps of said sliding rests. The said sliding rests are stepped higher than the front stationary rests F' to compensate for the difference in height between the front and rear axle of the vehicle.

Located at the inner end of the shaft is the lock hinge K, which is designed to fold with the jack when the vehicle is lowered, and also to lock the same in its upright position when the vehicle is raised. The said hinge comprises the opposite members L centrally hinged as at *l* and connected with the handle connecting rod F and the rear connecting rod or round B by means of the straps M, loosely embracing said connecting rods and working in recesses *m* in said rods adapted for their reception.

In operation the jack is shoved under the vehicle from the rear and by means of the handles E is swung up until the stationary and sliding rests have been placed in position under their respective axles, at which time the swinging arms C are not quite vertical, but by a continuous pull upon said handles, the said arms are easily raised to a vertical position and therefore both axles of the vehicle lifted simultaneously and locked in such lifted position by means of the lock hinge K. By breaking said hinge with the knee or foot, the jack may be folded and the vehicle lowered.

Having thus described our invention, what we claim and desire to secure by Letters Patent is:—

1. In a lifting jack, the combination, with the ground sills; of swinging lever arms loosely connected in pairs with said sills at each end thereof, horizontal supporting bars carried upon the upper ends of said swinging lever arms and terminating at one end in operating handles, opposite connected stepped rests simultaneously slidable upon said supporting bars near one end thereof, stationary stepped rests secured to the opposite ends of said bars, and a lock hinge comprising opposite members centrally hinged at their meeting ends and pivotally connected at their other ends with said sills and the handle portions of said bars, respectively, substantially as set forth.

2. In a lifting jack, the combination with the ground sills and connecting rods at each end, of swinging lever arms working over said rods in pairs at each end of said sills, horizontal supporting bars carried by said lever arms and terminating at one end in operating handles and provided with grooves upon the inner faces adjacent to said handles, stationary rests located upon one end of said bars, adjustable rests having flanged tongues working in said grooves, and a lock hinge loosely connected with the rear sill connecting rod and the handle portions of said bars, substantially as set forth.

In testimony that we claim the foregoing as our own we have hereto affixed our signatures in the presence of two witnesses.

NELSON EVANS.
WILLIAM A. HENRY.

Witnesses:
W. W. PORTERFIELD,
W. H. FORSE.